United States Patent [19]

Kleiner et al.

[11] Patent Number: 4,515,925
[45] Date of Patent: May 7, 1985

[54] POLYCARBONATE/POLYBUTYLENE TEREPHTHALATE FILM

[75] Inventors: Frank Kleiner, Leverkusen; Rolf Kubens, Odenthal-Hahnenberg; Eckart Reese; Joachim Wank, both of Dormagen, all of Fed. Rep. of Germany

[73] Assignee: Bayer Aktiengesellschaft, Leverkusen, Fed. Rep. of Germany

[21] Appl. No.: 536,616

[22] Filed: Sep. 28, 1983

[30] Foreign Application Priority Data

Oct. 9, 1982 [DE] Fed. Rep. of Germany ....... 3237477

[51] Int. Cl.$^3$ ............................................. C08L 67/02
[52] U.S. Cl. ................................................... 525/439
[58] Field of Search ......................................... 525/439

[56] References Cited

U.S. PATENT DOCUMENTS

| 3,953,539 | 4/1976 | Kawase et al. | 525/439 |
| 3,956,229 | 5/1976 | Bollen et al. | 525/439 |
| 4,034,016 | 7/1977 | Baron et al. | 525/439 |
| 4,044,073 | 8/1977 | Baron et al. | 525/439 |
| 4,115,333 | 9/1978 | Phipps et al. | 525/439 |
| 4,226,961 | 10/1980 | Motz | 525/439 |

FOREIGN PATENT DOCUMENTS 115146 11/1974 Japan .

*Primary Examiner*—Harold D. Anderson
*Attorney, Agent, or Firm*—Connolly and Hutz

[57] ABSTRACT

Mixtures of (A) from 50 to 90% by weight of aromatic polycarbonate and (B) from 10 to 50% by weight of polybutylene terephthalate, the percent by weight being based on the total of (A) and (B) are used to produce novel films.

6 Claims, No Drawings

POLYCARBONATE/POLYBUTYLENE TEREPHTHALATE FILM

This invention relates to the use of mixtures of aromatic polycarbonate and polybutylene terephthalate for the production of films.

If polybutylene terephthalate films are stretched monoaxially, they shrink during heating not only in the direction of stretching, but also transversely thereto. This undesired property cannot be avoided even by thermofixing.

Surprisingly, it has now been found that stretched films may be produced from polycarbonate/polybutylene terephthalate mixtures which, during heating, only shrink in the direction of stretching. This means that the films are advantageous, for example for the production of shrinkage coils and shrinkage capacitors.

Thus, the present invention relates to the use of mixtures of

A. from 50 to 90% by weight of aromatic polycarbonte, and

B. from 10 to 50% by weight of polybutylene terephthalate (in each case based on the total of A and B) for the production of films.

Diphenols which are preferred for the production of the aromatic polycarbonates A are compounds corresponding to the formula (I):

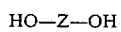

wherein Z represents a divalent mono- or polynuclear aromatic radical having from 6 to 30 carbon atoms, and is constructed such that each of the two OH groups is directly bound to a carbon atom of an aromatic system.

Particularly preferred diphenols are compounds corresponding to the formula (II):

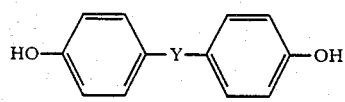

wherein Y represents a single bond, an alkylene or alkylidene radical having from 1 to 7 carbon atoms, a cycloalkylene or cycloalkylidene radical having from 5 to 12 carbon atoms,

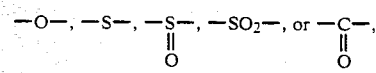

and nuclear-alkylated and nuclear-halogenated derivatives thereof.

Examples of the diphenols are:
hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones, and
α,α'-bis-(hydroxyphenyl)-diisopropylbenzenes,
and nuclear-alkylated and nuclear-halogenated derivatives thereof. These and other suitable diphenols are described in, for example, U.S. Pat. No. 3,028,365; 3,275,601; 3,148,172; 3,062,781; 2,991,273; 3,271,367; 2,999,835; 2,970,131 and 2,999,846; in German Offenlegungsschrift Nos. 1,570,703; 2,063,050; 2,063,052; 2,211,956; 2,211,957, in French Pat. No. 1,561,518 and in the Monograph by H. Schnell, "Chemistry and Physics of Polycarbonates", Interscience Publishers, New York.

Preferred diphenols include the following, for example:
4,4'-dihydroxydiphenyl,
2,4-bis-(4-hydroxyphenyl)-2-methylbutane,
α,α'-bis(4-hydroxyphenyl)-p-diisopropylbenzene,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
bis-(3,5-dimethyl-4-hydroxyphenyl)-sulphone,
2,4-bis-(3,5-dimethyl-4-hydroxyphenyl)-2-methylbutane,
1,1-bis-(3,5-dimethyl-4-hydroxyphenyl)-cyclohexane, and
α,α'-bis-(3,5-dimethyl-4-hydroxyphenyl)-p-diisopropylbenzene.

Diphenols which are particularly preferred include the following, for example:
2,2-bis-(4-hydroxyphenyl)-propane,
2,2-bis-(3,5-dimethyl-4-hydroxyphenyl)-propane,
2,2-bis-(3,5-dichloro-4-hydroxyphenyl)-propane,
2,2-bis-(3,5-dibromo-4-hydroxyphenyl)-propane, and
1,1-bis-(4-hydroxyphenyl)-cyclohexane.

Preferred aromatic polycarbonates A are those which are based on one or more of the diphenols which have been mentioned as being preferred. Copolycarbonates are particularly preferred which are based on 2,2-bis-(4-hydroxyphenyl)-propane and on one of the other diphenols which have been mentioned as being particularly preferred. Furthermore, polycarbonates A are particularly preferred which are based only on 2,2-bis-(4-hydroxyphenyl)-propane or 2,2-bis-(3,5-dimethyl-4-hydroxyphenyl)-propane.

The aromatic polycarbonates A may be produced according to known processes, for example according to the melt-transesterification process from diphenols and diphenylcarbonate, and by the two-phase-interface process from diphenols and phosgene, as described in the abovementioned literature.

The aromatic polycarbonates A may be branched by the incorporation of small quantities, preferably quantities of from 0.05 to 2.0 mol % (based on the diphenols which are used), of more than difunctional compounds, in particular such compounds which have three or more than three phenolic hydroxy groups.

Polycarbonates of this type are described in, for example, German Offenlegungsschrift Nos. 1,570,533; 1,595,762; 2,116,974 and 2,113,347, in British Pat. No. 1,079,821 in U.S. Pat. No. 3,544,514 and in German Offenlegungsschrift No. 2,500,092.

The aromatic polycarbonates A should usually have relative solution viscosities of from 1.16 to 1.5, measured in dichloromethane at 20° C. and in a concentration of 0.5 g of polycarbonate in 100 ml of solution.

The following are preferably used as chainterminators for adjusting the molecular weight of the aromatic polycarbonates A: phenol, alkylphenols having $C_1-C_{12}$ alkyl groups, halogenated phenols, hydroxydiphenyls, naphthols, chlorocarbonic acid esters of such phenolic compounds and chlorides of aromatic monocarboxylic acids which may optionally be substituted by $C_1$–$C_{22}$ alkyl groups and halogen atoms, also chlorides of aliphatic monocarboxylic acids having up to 25 carbon atoms, in quantities of from 0.1 to 10 mol % (in the case of phenols, based on diphenols, in the case of acid chlorides, based on acid dichlorides).

Preferred polybutylene terephthalates B contain at least 80, preferably at least 90 mol %, based on the dicarboxylic acid component, of terephthalic acid radicals and at least 80, preferably at least 90 mol %, based on the diol component, of butanediol-1,4 radicals.

The preferred polybutylene terephthalates B may contain, in addition to terephthalic acid radicals, up to 20 mol % of radicals of other aromatic dicarboxylic acids having from 8 to 14 carbon atoms or aliphatic dicarboxylic acids having from 4 to 12 carbon atoms, for example radicals of phthalic acid, isophthalic acid, napthalene-2,6-dicarboxylic acid, 4,4'-diphenyl-dicarboxylic acid, succinic acid, adipic acid, sebacic acid, azelaic acid and cyclohexane di-acetic acid.

The preferred polybutylene terephthalates B may contain, in addition to butanediol-1,4 radicals, up to 20 mol % of radicals of other aliphatic diols having from 2 to 12 carbon atoms or cycloaliphatic diols having from 6 to 21 carbon atoms, for example radicals of ethylene glycol, propanediol-1,2, propanediol-1,3, 2-ethyl-propanediol-1,3, neopentyl glycol, pentanediol-1,5, hexanediol-1,6, cyclohexane-dimethanol-1,4, 3-methylpentanediol-2,4, 2-methylpentanediol-2,4, 2,2,4-trimethyl-pentanediol-1,3 and -1,6, 2-ethylhexanediol-1,3, 2,2-diethylpropanediol-1,3, hexanediol-2,5, 1,4-di-($\beta$-hydroxyethoxy)-benzene, 2,2-bis-(4-hydroxycyclohexyl)-propane, 2,4-dihydroxy-1,1,3,3-tetramethyl-cyclobutane, 2,2-bis-(3-$\beta$-hydroxyethoxy)-propane and 2,2-bis-(4-hydroxypropoxy-phenyl)-propane (DE-OS Nos. 2,407,674; 2,407,776; 2,715,932).

The polybutylene terephthalates B may be branched by incorporating relatively small quantities of tri- or tetrahydric alcohols or tri- or tetrabasic carboxylic acids, as described in, for example, DE-OS No. 1,900,270 and in U.S. Pat. No. 3,692,744. Examples of preferred branching agents include trimesic acid, trimellitic acid, trimethylol ethane and trimethylol propane and pentaerythritol.

It is advisable to use no more than 1 mol % of the branching agent, based on the acid component.

Polybutylene terephthalates B are particularly preferred which are produced only from terephthalic acid and/or reactive derivatives thereof (for example dialkyl esters thereof) and butanediol-1,4.

The polybutylene terephthalates which are preferably used as component B generally have an intrinsic viscosity of from 0.4 to 1.5 dl/g, preferably from 0.5 to 1.3 dl/g, in particular from 0.6 to 1.2 dl/g, in each case measured in phenol/o-dichlorobenzene (1:1 part by weight) at 25° C.

The films may be produced in a known manner from the mixtures A+B. The thickness of the films is usually from 5 to 500 μm and preferably from 25 to 100 μm. They may be stretched in a ratio of from 1:1.5 to 1:4.

EXAMPLES

Comparison

Polybutylene terephthalate having an intrinsic viscosity of 1.20 dl/g, measured in phenol/o-dichlorobenzene (1:1 part by weight) at 25° C. is melted on a single shaft extruder, the melt is extruded through a sheet dye and is drawn out into a 40 μm thick film by means of a chill-roll installation. The resulting film is stretched in a ratio of 1:2 on a longitudinal stretching installation at a temperature of 140° C.

On heating to 160° C., the film thus obtained exhibits a free shrinkage of 30% in the longitudinal direction and of 15% in the transverse direction.

EXAMPLE 1

A mixture of 40 parts by weight of polybutylene terephthalate having an intrinsic viscosity of 1.20 dl/g, measured in phenol/o-dichlorobenzene (1:1 part by weight) at 25° C., and 60 parts by weight of bisphenol-A-polycarbonate having a relative viscosity of 1.30, measured in dichloromethane at 20° C. and in a concentration of 0.5 g of polycarbonate in 100 ml of solution, is processed into a 40 μm thick film according to the above-described Comparative Example, and is stretched in a ratio of 1:2 on a longitudinal stretching installation at a temperature of 145° C.

On heating to 160° C., the film shrinks by 40% in the longitudinal direction, whereas the width increases by 0.2%.

EXAMPLE 2

A mixture according to Example 1 of 40 parts by weight of polybutylene terephthalate and 60 parts by weight of bisphenol-A-polycarbonate is melted on a single shaft extruder, the melt is extruded through a tubular die and the resulting tube is inflated in diameter in a ratio of 1:4.

The tube is laid flat and wound up in a known manner by means of a blowing film draw-off. The draw-off speed is adjusted so that the finished film has a thickness of 10 μm.

The film tube which is obtained is cut off at the pinched edges and the film webs are wound up separately. The film web thus obtained is stretched lengthwise in a ratio of 1:3.3 on a longitudinal stretching installation in the multiple gap stretching process. The 3 μm thick film which is obtained is aluminized under a high vacuum at $10^{-4}$ torr. Metal-free zones are obtained by cover strips, 4 mm wide.

The narrow cut rolls which are obtained are wound together in pairs into capacitors, the metal-free edges lying opposite each other. The winding is heated to 120° C. to strengthen it. The individual film layers are contacted by spraying on zinc according to the flame-spraying process. Since the film according to the present invention does not shrink in the trasverse direction, the film edges are prevented from retracting in this thermal shock treatment and are prevented from thereby resulting in a short circuit of the individual film layers.

EXAMPLE 3

25 g/m² of a self-cross-linking acrylic acid iso-octyl ester, dissolved in methyl ethyl ketone, are applied to a film which is produced according to Example 1, in a coating installation, the solvent of the adhesive is evaporated in a drying channel and the film is then wound up.

The self-adhesive film which is cut into strips is bonded radially around electrolytic capacitors, the ends of the film overlapping by 3 mm. The width of the film is selected so that the edges project by 2 mm on each side. The electrolytic capacitors thus prepared pass through a hot air channel, the air temperature and the passage speed being adjusted such that the film is heated to about 150° C. As a result of this thermal treatment, the film shrinks firmly onto the housing of the electrolytic capacitor, and the projecting edges are positioned around the borders so that the housing of the capacitor is completely insulated electrically.

We claim:

1. A film comprising a mixture of
   A. from 50 to 90% by weight of aromatic polycarbonate, and
   B. from 10 to 50% by weight of polybutylene terephthalate the % by weight, being based on the total of A and B where after said film is monoaxially stretched, then upon heating said film shrinks in the direction of stretching, but substantially not transverse thereto.

2. A film as claimed in claim 1, wherein the aromatic polycarbonate has been produced from a diphenol corresponding to formula (I):

$$HO-Z-OH \qquad (I)$$

wherein Z represents a divalent mono- or polynuclear aromatic radical having from 6 to 30 carbon atoms, and is constructed such that each of the two OH groups is directly bound to one carbon atom of an aromatic ring.

3. A film as claimed in claim 2, wherein the diphenol corresponds to the formula (II):

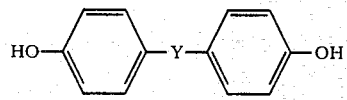

wherein Y represents a single bond or Y represents, an alkylene or alkylidene radical having from 1 to 7 carbon atoms, a cycloalkylene or cycloalkylidene radical having from 5 to 12 carbon atoms,

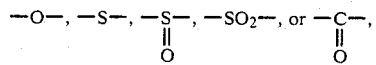

or a nuclear-alkylated or nuclear-halogenated derivative thereof.

4. A film as claimed in claim 1 wherein the polybutylene terephthalate has a dicarboxylic acid component and a diol component and wherein the polybutylene therephthalate contains at least 80 mol %, based on the dicarboxylic acid component, of terephthalic acid radicals and at least 80 mol %, based on the diol component of butanediol-1,4 radicals.

5. A film as claimed in claim 4, wherein the polybutylene terephthalate has been produced only from A and B wherein A comprises therephthalic acid, reactive derivatives thereof or mixtures thereof and B is butanediol-1,4.

6. A film as claimed in claim 1 which has been monoaxially stretched.

* * * * *